US011288816B2

(12) United States Patent
Ogawa

(10) Patent No.: US 11,288,816 B2
(45) Date of Patent: *Mar. 29, 2022

(54) IMAGE DETECTION DEVICE, IMAGE DETECTION METHOD AND STORAGE MEDIUM STORING PROGRAM

(71) Applicant: NEC CORPORATION, Tokyo (JP)

(72) Inventor: Takuya Ogawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 235 days.

This patent is subject to a terminal disclaimer.

(21) Appl. No.: 16/561,490

(22) Filed: Sep. 5, 2019

(65) Prior Publication Data

US 2020/0005471 A1     Jan. 2, 2020

Related U.S. Application Data

(63) Continuation of application No. 16/090,005, filed as application No. PCT/JP2017/011605 on Mar. 23, 2017, now Pat. No. 11,107,223.

(30) Foreign Application Priority Data

Mar. 31, 2016  (JP) ................................ 2016-072412

(51) Int. Cl.
*G06T 7/246* (2017.01)
*H04N 7/18* (2006.01)
(Continued)

(52) U.S. Cl.
CPC ............... *G06T 7/246* (2017.01); *G06T 7/00* (2013.01); *G06T 7/20* (2013.01);
(Continued)

(58) Field of Classification Search
CPC ... G06K 2009/3291; G06K 2009/6213; G06K 2209/23; G06K 9/3241; G06K 9/4642;
(Continued)

(56) References Cited

U.S. PATENT DOCUMENTS 5,612,745 A   3/1997 Ozcelik et al.
5,912,980 A   6/1999 Hunke
(Continued)

FOREIGN PATENT DOCUMENTS

JP   H04-281688 A   10/1992
JP   2002-157599 A   5/2002
(Continued)

OTHER PUBLICATIONS

Communication dated Jul. 23, 2020, from the United States Trademark and Patent Office in U.S. Appl. No. 16/090,005.
(Continued)

*Primary Examiner* — Ian L Lemieux
(74) *Attorney, Agent, or Firm* — Sughrue Mion, PLLC

(57) ABSTRACT

Provided are an image detection device, an image detection method and a program, which are capable of improving correspondence to a target deformation by optimizing a template shape, when performing target detection using template matching. An image detection device 100 for detecting a target from an input image comprises: a template generation unit 10 that generates a template for detecting a target; a mask generation unit 20 that generates a mask which shields a portion of the template, on the basis of temporal variations of a feature point extracted from an area including the image target; and a detection unit 30 that detects the target from the image using the template a portion of which is shielded by the mask.

9 Claims, 10 Drawing Sheets

(51) Int. Cl.
 *G06T 7/00* (2017.01)
 *G06T 7/20* (2017.01)
 *G08B 13/196* (2006.01)

(52) U.S. Cl.
 CPC ......... *G08B 13/19617* (2013.01); *H04N 7/18* (2013.01); *H04N 7/183* (2013.01); *G06T 2207/30241* (2013.01)

(58) Field of Classification Search
 CPC .. G06K 9/6255; G08B 13/19617; H04N 7/18; H04N 7/183; G06T 2207/30241; G06T 7/00; G06T 7/20; G06T 7/246; G06T 7/248
 See application file for complete search history.

(56) References Cited

U.S. PATENT DOCUMENTS

| | | | |
|---|---|---|---|
| 6,081,605 A | 6/2000 | Roth et al. | |
| 7,796,801 B2 | 9/2010 | Kitamura et al. | |
| 8,400,619 B1 | 3/2013 | Bachrach et al. | |
| 8,837,773 B2* | 9/2014 | Katano | G06T 7/248 382/103 |
| 8,958,654 B1 | 2/2015 | Evans et al. | |
| 10,318,792 B2* | 6/2019 | Shinohara | H04N 5/232 |
| 2004/0131249 A1* | 7/2004 | Sandrew | H04N 9/43 382/162 |
| 2006/0120564 A1 | 6/2006 | Imagawa et al. | |
| 2006/0245500 A1 | 11/2006 | Yonovitz | |
| 2010/0054540 A1* | 3/2010 | Brown | G06K 9/2081 382/107 |
| 2011/0228979 A1 | 9/2011 | Nishino et al. | |
| 2011/0267489 A1 | 11/2011 | Sagawa et al. | |
| 2014/0119599 A1* | 5/2014 | Dal Mutto | G06F 3/011 382/103 |
| 2014/0348390 A1* | 11/2014 | Liu | G06K 9/00785 382/104 |
| 2015/0161773 A1* | 6/2015 | Takahashi | H04N 5/272 382/173 |
| 2015/0206004 A1 | 7/2015 | Liang et al. | |
| 2016/0140697 A1 | 5/2016 | Sugimoto et al. | |
| 2016/0142727 A1 | 5/2016 | Bernal et al. | |
| 2017/0018090 A1 | 1/2017 | Crivelle et al. | |
| 2017/0038307 A1 | 2/2017 | Ohta et al. | |
| 2019/0114788 A1* | 4/2019 | Aizawa | G06T 7/231 |
| 2019/0188490 A1* | 6/2019 | Ito | G06T 7/536 |
| 2020/0005470 A1 | 1/2020 | Ogawa | |
| 2020/0005471 A1 | 1/2020 | Ogawa | |
| 2020/0380274 A1* | 12/2020 | Shin | G06K 9/00664 |

FOREIGN PATENT DOCUMENTS

| | | |
|---|---|---|
| JP | 2011-192141 A | 9/2011 |
| JP | 2013-254386 A | 12/2013 |
| JP | 2015-138554 A | 7/2015 |

OTHER PUBLICATIONS

Georg Nebehay, et al. "Clustering of Static-Adaptive Correspondences for Deformable Object Tracking", Institute for Computer Graphics and Vision, Graz University of Technology, IEEE, 2015, pp. 2784-2791.

Toshimitsu Kaneko, et al., "Update Criterion of Image Template for Visual Tracking Using Template Matching", Transactions of the Institute of Electronics, Information and Communication Engineers D, 2005, vol. J88-D2, No. 8, pp. 1378-1388.

Written Opinion for PCT/JP2017/011605 dated Jun. 13, 2017 [PCT/ISA/237].

International Search Report for PCT/JP2017/011605 dated Jun. 13, 2017 [PCT/ISA/210].

U.S. Notice of Allowance for U.S. Appl. No. 16/090,005 dated Apr. 30, 2021.

Japanese Office Action for JP Application No. 2018-509154 dated Mar. 30, 2021 with English Translation.

* cited by examiner

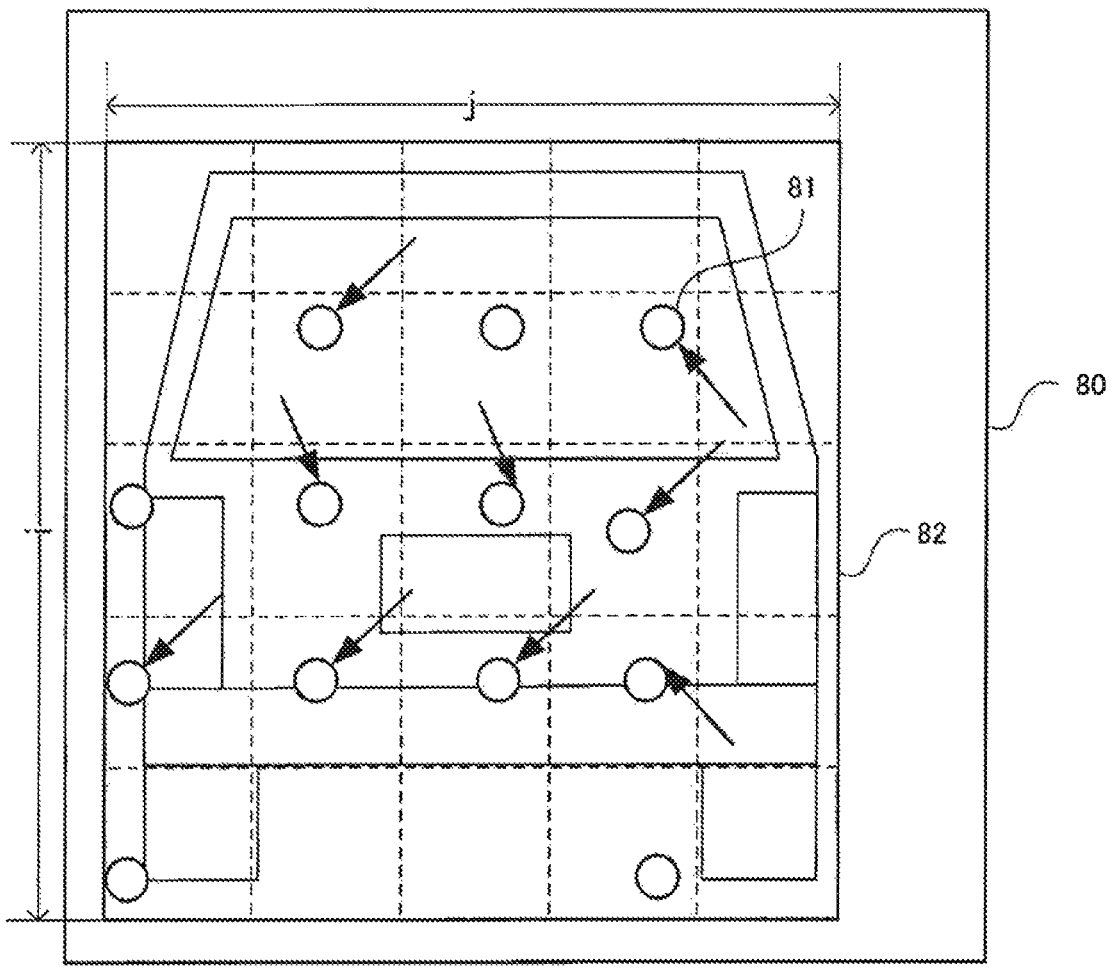

IMAGE DETECTION DEVICE, IMAGE DETECTION METHOD AND STORAGE MEDIUM STORING PROGRAM

CROSS REFERENCE TO RELATED APPLICATIONS

This application is a Continuation of U.S. application Ser. No. 16/090,005 filed Sep. 28, 2018, which is a National Stage of International Application No. PCT/JP2017/011605 filed Mar. 23, 2017, claiming priority based on Japanese Patent Application No. 2016-072412 filed Mar. 31, 2016, the disclosure of which is incorporated herein in its entirety by reference.

TECHNICAL FIELD

The present invention relates to an image detection device and an image detection method for detecting an object from an image, and also to a program for achieving the device and method.

BACKGROUND ART

In recent years, with the progress of camera technology, surveillance systems employing a surveillance camera have been used increasingly. Such surveillance systems detect an object or the like to be a surveillance target in an image acquired from a surveillance camera, and tracking the detected object.

In order to perform detection and tracking of a surveillance target in an image, various kinds of methods have been proposed (refer to Non-Patent Literature (NPL) 1 and NPL 2, for example). Specifically, NPL 1 discloses a method which performs detection and tracking of a surveillance target on the basis of a distribution of feature points of the surveillance target. NPL 2 discloses a method which performs detection and tracking of a surveillance target by performing matching between an image of the surveillance target in a captured image and a template image.

While the method disclosed in NPL 1, which uses a distribution of feature points, has a characteristic of being robust against deformation of a surveillance target, it also has an issue in that the right surveillance target is not easy to be tracked again when a tracked surveillance target has been switched to another thing, and when the surveillance target has gone out of the surveillance area, because extracted features are used.

In contrast, the method disclosed in NPL 2, which uses template matching, has high matching performance and is capable of tracking a right surveillance target again even when the tracked surveillance target has switched to another thing and when a surveillance target has gone out of the surveillance area. Accordingly, the method disclosed in NPL 2 is able to resolve the issue of the method disclosed in NPL 1, but has an issue of weakness in deformation of a surveillance target.

With respect to those issues, Patent Literature (PTL) 1 proposes a method for overcoming the issue of being vulnerable to deformation of surveillance target in the case of using template matching. Specifically, PTL 1 discloses a method which generates a mask by labeling a binary image and updates a size of a template by using the length of a narrow side of a rectangular area including the generated mask. By the method disclosed in PTL 1, a template can be updated depending on deformation of a surveillance target, the issue of weakness in deformation of a surveillance target is considered to be resolved.

CITATION LIST

Patent Literature

PTL 1: Japanese Unexamined Patent Application Publication No. 2013-254386

Non Patent Literature

NPL 1: Georg Nebehay, "Clustering of Static-Adaptive Correspondences for Deformable Object Tracking", Institute for Computer Graphics and Vision, Graz University of Technology, IEEE, 2015.

NPL 2: Toshimitsu Kaneko and Osamu Hori, "Update Criterion of Image Template for Visual Tracking Using Template Matching", Transactions of the Institute of Electronics, Information and Communication Engineers D, Vol. J88-D2, No. 8, pp. 1378-1388, 2005.

SUMMARY OF INVENTION

Technical Problem

However, because a shape of a template is not optimized even in the method disclosed in PTL 1, and the background may intrude into a part of a template even when a size thereof is optimized, tracking may become more difficult depending on a degree of deformation of a surveillance target even by the method disclosed in PTL 1.

An example of an objective of the present invention is to provide an image detection device, an image detection method and a program which are capable of resolving the issues described above, and are capable of improving ability of coping with deformation of a target by performing optimization of a shape of a template in a case of detecting a target by template matching.

Solution to Problem

In order to achieve the objective described above, an image detection device according to an aspect of the present invention includes:

template generation means for generating a template for detecting a target;

mask generation means for generating a mask partly shielding the template based on temporal variation of feature points extracted from an area including the target in an input image; and detection means for detecting the target from the image by using the template partly shielded by the mask.

In order to achieve the objective described above, an image detection method according to an aspect of the present invention includes:

generating a template for detecting a target;

generating a mask partly shielding the template based on temporal variation of feature points extracted from an area including the target in an input image; and detecting the target from the image using the template partly shielded by the mask.

In order to achieve the objective described above, a storage medium according to an aspect of the present invention stores a program causing a computer to execute:

a template generation process of generating a template for detecting a target;

a mask generation process of generating a mask partly shielding the template based on temporal variation of feature points extracted from an area including the target in an input image; and a detection process of detecting the target from the image by using the template partly shielded by the mask.

Advantageous Effects of Invention

As described above, the present invention is capable of improving ability of coping with deformation of a target by performing optimization of a shape of a template in a case of detecting a target by template matching.

BRIEF DESCRIPTION OF DRAWINGS

FIG. 7 is a diagram for explaining a step B4 illustrated in FIG. 4.

EXAMPLE EMBODIMENTS

Example Embodiment

Hereinafter, an image detection device, an image detection method and a program of an example embodiment of the present invention are described with reference to FIGS. 1 to 9.

Device Configuration

Figure 1:
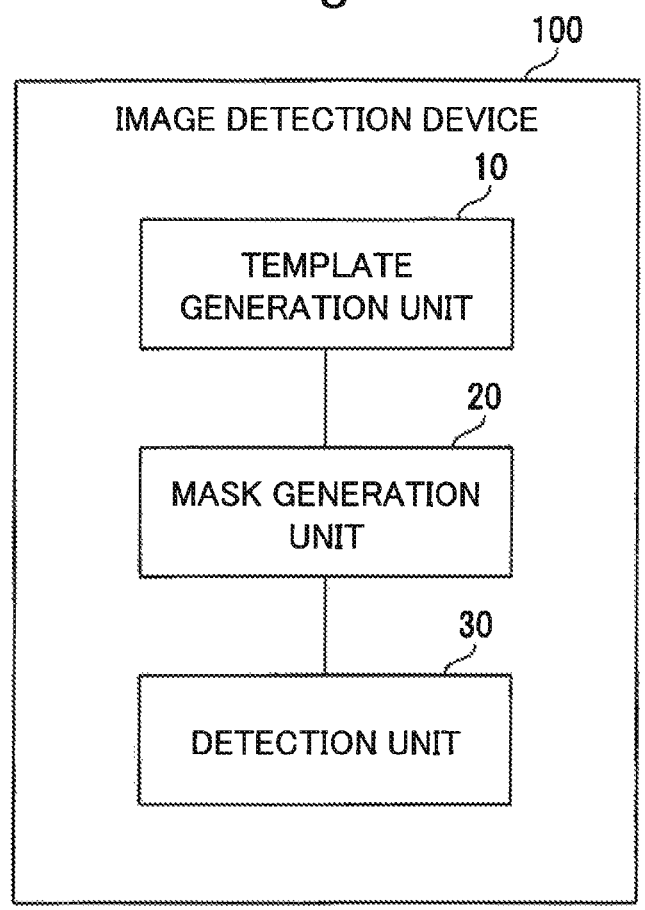
FIG. 1 is a block diagram showing a schematic configuration of an image detection device of an example embodiment of the present invention.

First, a schematic configuration of an image detection device of the present example embodiment is described by using FIG. 1. FIG. 1 is a block diagram showing a schematic configuration of an image detection device of the present embodiment.

The image detection device 100 of the present example embodiment shown in FIG. 1 is a device for detecting a target from an input image. As shown in FIG. 1, the image detection device 100 includes a template generation unit 10, a mask generation unit 20 and a detection unit 30.

The template generation unit 10 generates a template for detecting a target. The mask generation unit 20 generates a mask partly shielding (occluding) the template on the basis of temporal variation of feature points extracted from an area (hereafter, referred to as a "target area") including the target in an image. The detection unit 30 detects the target from an image using the template partly shielded by the mask.

Thus, in the present example embodiment, a shape of a template is optimized on the basis of temporal variation of feature points in an image of a target. As a result, the present example embodiment in a case of performing target detection by template matching, is capable of improving ability of coping with deformation of a target in a case of detecting a target by template matching.

Figure 2:
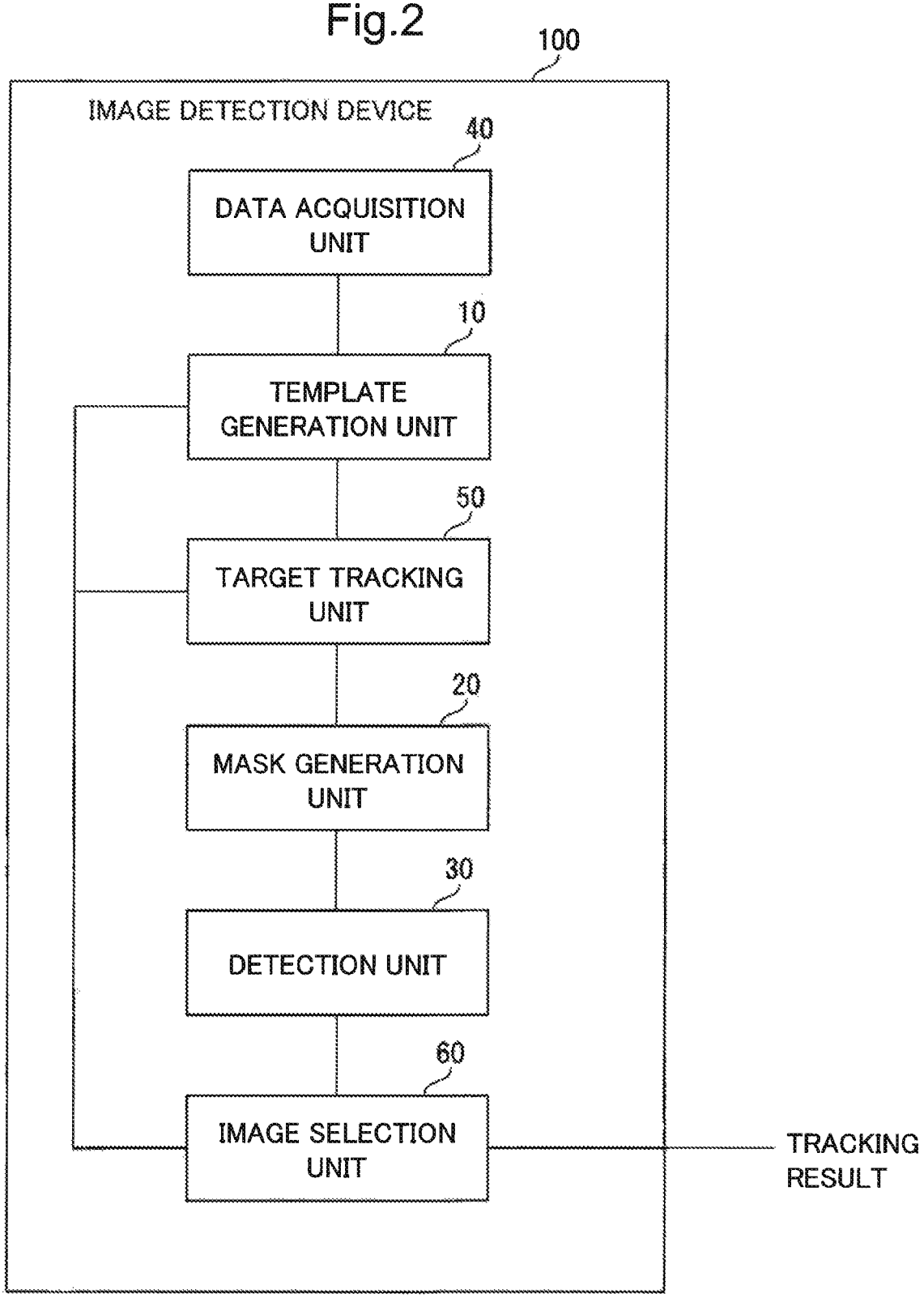
FIG. 2 is a block diagram specifically showing the configuration of the image detection device of the example embodiment of the present invention.

Next, the configuration of the image detection device 100 of the present example embodiment is described more specifically by using FIG. 2. FIG. 2 is a block diagram specifically showing the configuration of the image detection device of the present example embodiment.

As shown in FIG. 2, in the present example embodiment, the image detection device 100 further includes a data acquisition unit 40, a target tracking unit 50 and an image selection unit 60, in addition to the template generation unit 10, the mask generation unit 20 and the detection unit 30.

Among these units, the data acquisition unit 40 acquires an image from outside, and inputs the image to the template generation unit 10. Specifically, the data acquisition unit 40 acquires image data for each frame of an image captured by a camera. The data acquisition unit 40 also acquires data (hereafter, referred to as "target designating data") designating a target of detection and tracking, and inputs also the target designating data to the template generation unit 10. The designating data may be image data of a target, and may be data specifying features of the target. The designating data may be data acquired through a user's selection on a screen, and may be data designated by a computer.

In the present example embodiment, when generation of a template has not been performed even once yet, the template generation unit 10 generates a template using the image data and target designating data input by the data acquisition unit 40. The template includes image data of a target or data based on the image data of a target. The data based on the image data of a target may be data obtained by converting the image data into brightness or color difference, a histogram of the image data, or the like.

When an image is selected by an image selection unit 60 described later, the template generation unit 10 trains a new template using the selected image, and accordingly updates a template. That is, the template generation unit 10 functions also as a template learning unit which trains a template.

The target tracking unit 50 tracks a target by using, among feature points extracted form an area (i.e. target area) including a target in an image, a feature point other than feature points extracted from an area overlapping a generated mask. In other words, the target tracking unit 50 tracks a target by performing processing of matching between feature points extracted from a region other than a mask in a target area of a previous frame and feature points of a current frame.

In the present example embodiment, by the use of feature points extracted by the target tracking unit 50, the mask generation unit 20 determines moving directions of the feature points, that is, directions of change in position of the feature points between a previous frame and a current frame, as temporal variation of the feature points.

In the present example embodiment, the mask generation unit 20 determines a dominant direction in the determined moving directions of the feature points, and generates a mask by shielding, in the template, a region including feature points whose moving direction is different from the dominant direction. The mask generation unit 20 may generate a mask by further shielding a region including no feature point in the template. When the number of feature points of a most frequent moving direction is more than half of the total number of feature points, the most frequent moving direction is determined as the dominant direction.

When, in a region, in the template, including feature points whose moving directions from the last frame are different from the dominant direction, the number or a proportion of feature points whose moving directions are the dominant direction is equal to or less than a certain value and such a state continues for a predetermined time period, the mask generation unit 20 may shield the region. The mask generation unit 20 generates a mask for each frame, and therefore the mask is updated frame by frame.

The detection unit 30 detects a target from image data acquired by the data acquisition unit 40 by using the template partly shielded by the mask generated by the mask generation unit 20. In this case, detection of a target may be performed either by template matching where feature points in the image data are matched with feature points in the template, or by a sliding window method where brightness and patterns are compared while sliding the template.

The image selection unit 60 calculates a similarity to the template for each of an image of an area obtained as a result of tracking a target, performed by the target tracking unit 50, and an image of the target detected by the detection unit 30. In calculation of a degree of similarity, the generated or updated mask is used for the template. Then, based on the similarity, the image selection unit 60 selects either of the images for which calculation of the similarity is performed.

Specifically, the image selection unit 60 may select, for example, an image having a higher similarity between the images for which calculation of the similarity is performed. The image selection unit 60 may select either of the images by further using position information on each of the images, in addition to the similarity according to comprehensive determination to make the template be updated appropriately.

When selection of an image is performed by the image selection unit 60, the template generation unit 10 updates the template using a selected image, as described above. The image selection unit 60 outputs image data of the selected image as image data of the target which are tracked.

Device Operation

Figure 3:
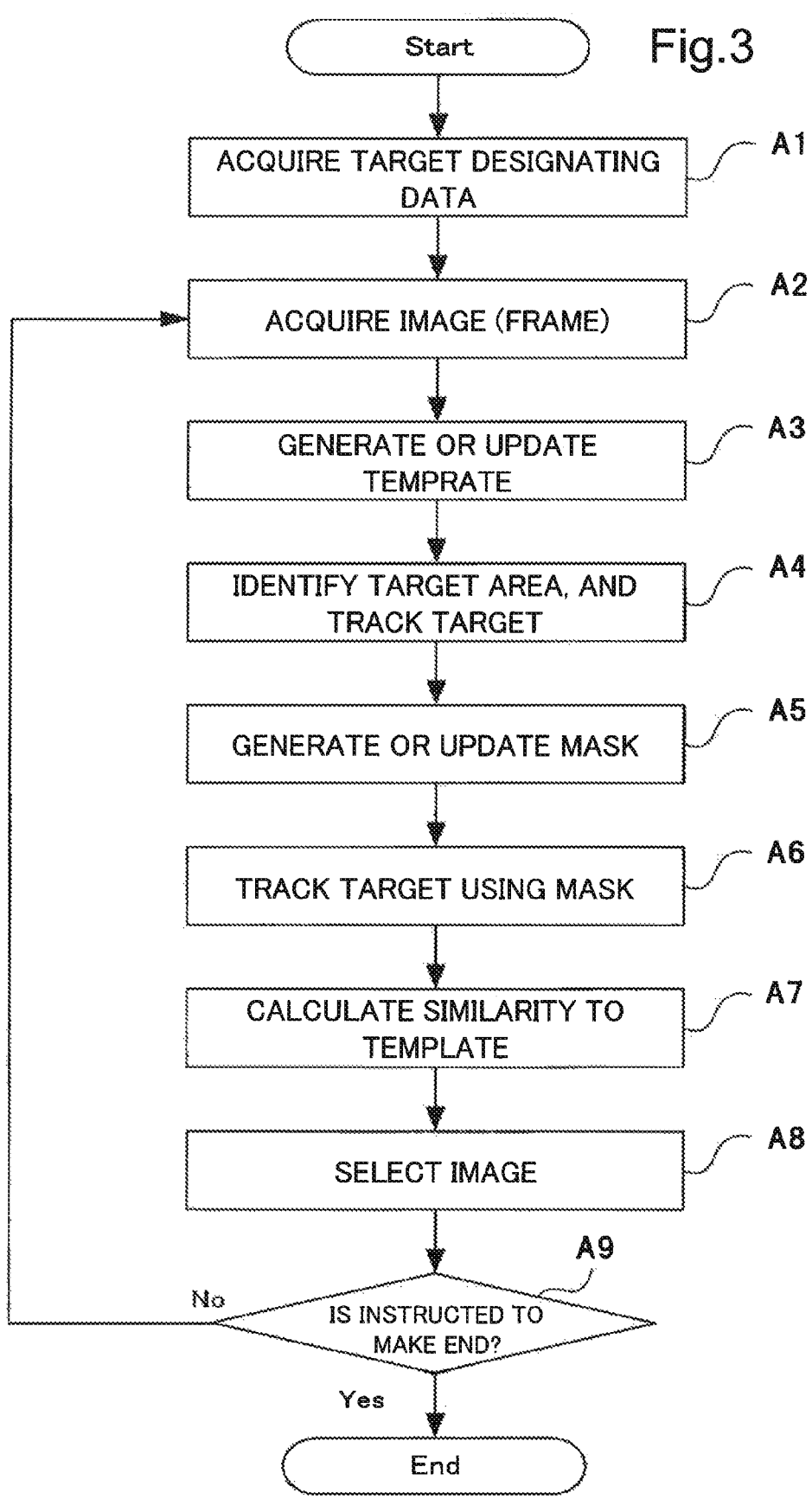
FIG. 3 is a flow chart showing operation of the image detection device of the example embodiment of the present invention.

Next, operation of the image detection device 100 of the present example embodiment is described using FIG. 3. FIG. 3 is a flow chart showing operation of the image detection device of the present example embodiment. In the following description, FIGS. 1 and 2 are appropriately taken into consideration. In the present example embodiment, an image detection method of the present invention is performed by operating the image detection device 100. Therefore, a description of the image detection method of the present example embodiment is represented by the following description of operation of the image detection device 100.

First, as shown in FIG. 3, the data acquisition unit 40 acquires target designating data which designates a target of detection and tracking (step A1). Subsequently, the data acquisition unit 40 acquires image data of an image captured by a camera (step A2). The image data is send separately for each frame. Therefore, the data acquisition unit 40 acquires image data of a single frame in the step A2.

Next, when generation of a template has not been performed even once yet, the template generation unit 10 generates a template by using the image data acquired in the step A2 and the target designating data acquired in the step A1 (step A3).

When a template has already been generated and a step A8 described later has been executed on the previous frame, the template generation unit 10 trains an image to be used as a new template, and updates templates.

Practically, two or more templates may be generated. In that case, when the step A8 described later is executed on the previous frame, the template generation unit 10 trains an image to be newly added as a template, and updates the templates.

Next, the target tracking unit 50 identifies a target area in the image, and tracks the target by using feature points extracted from the identified target area (step A4). When a mask is generated for the previous frame, the target tracking unit 50 excludes a feature point extracted from a region overlapping the generated mask, and tracks the target.

Next, when a mask partly shielding the template has not been generated yet, the mask generation unit 20 identifies temporal variation of the feature points in the target area identified in the step A4, which is, for example, moving directions of the feature points, and generates a mask on the basis of the identified temporal variation (step A5). When a mask has already been generated, the mask generation unit 20 generates a mask and updates an existing mask. The steps A4 and A5 are described later more specifically.

Next, the detection unit 30 detects a target from the image data acquired in the step A2 by using the template partly shielded by the mask generated in the step A5 (step A6).

Next, for each of images of the target area identified in the step A4 and of the target detected in the step A6, the image selection unit 60 calculates a similarity to the template generated or updated in the step A3 (step A7).

Next, based on calculated similarity, the image selection unit 60 selects either of the image of the target area and the image of the detected target (step A8). The image selection unit 60 outputs, to outside, image data of the selected image as image data of the target which is tracked.

Next, the data acquisition unit 40 determines whether the image detection device 100 is instructed to make an end of processing (step A9). The result of determination in the step A9 indicates that the image detection device 100 is instructed to make an end, the processing of the image detection device 100 is ended.

Meanwhile, as the result of determination in the step A9, when the end is not instructed, the data acquisition unit 40 executes the step A2 again, thereby acquiring image data of a new frame. By that, the steps A3 to A9 are executed further for the new frame.

Figure 4:
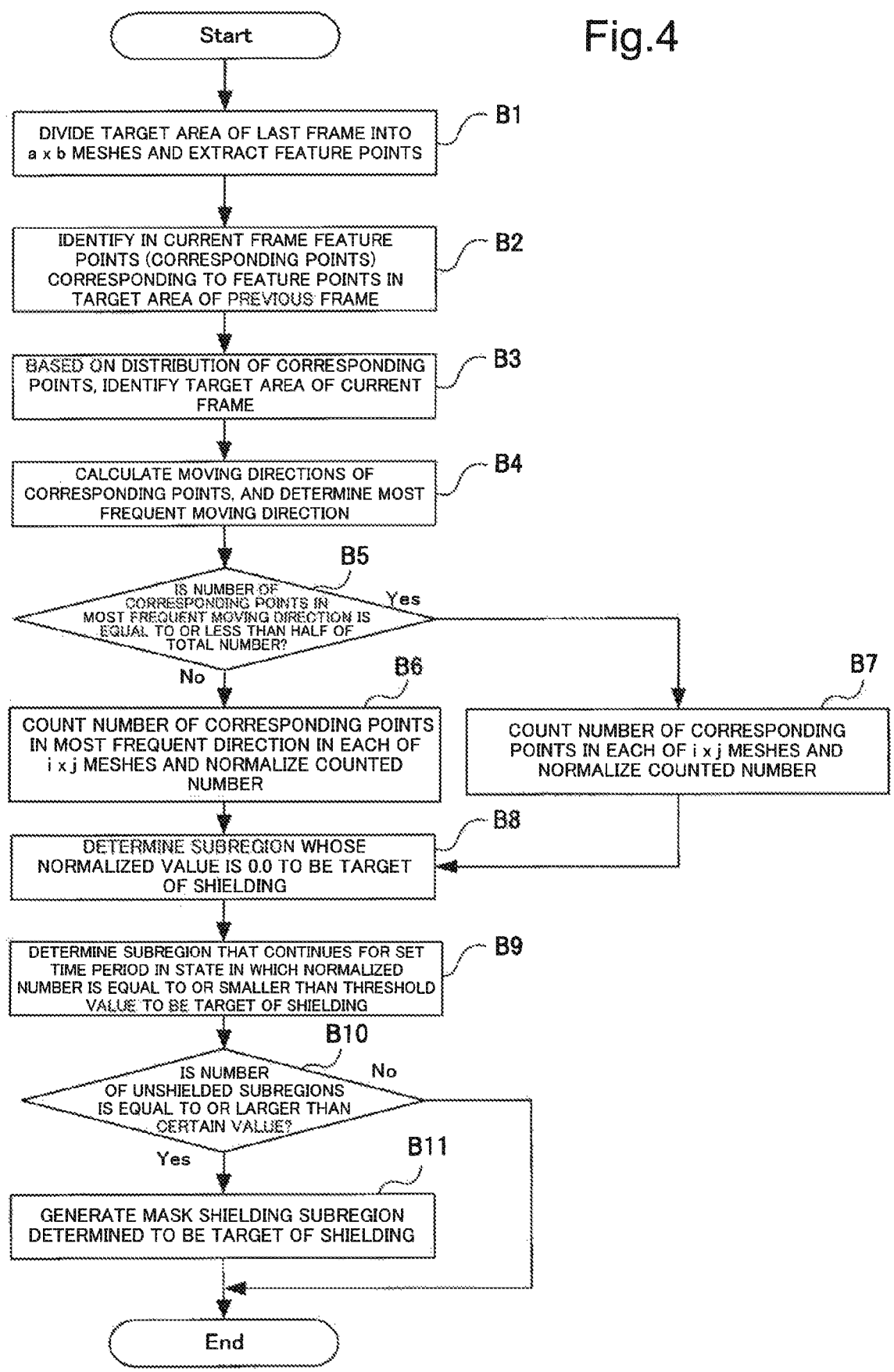
FIG. 4 is a flow chart specifically showing a tracking process and a mask generation and update process illustrated in FIG. 3.
Figure 5:
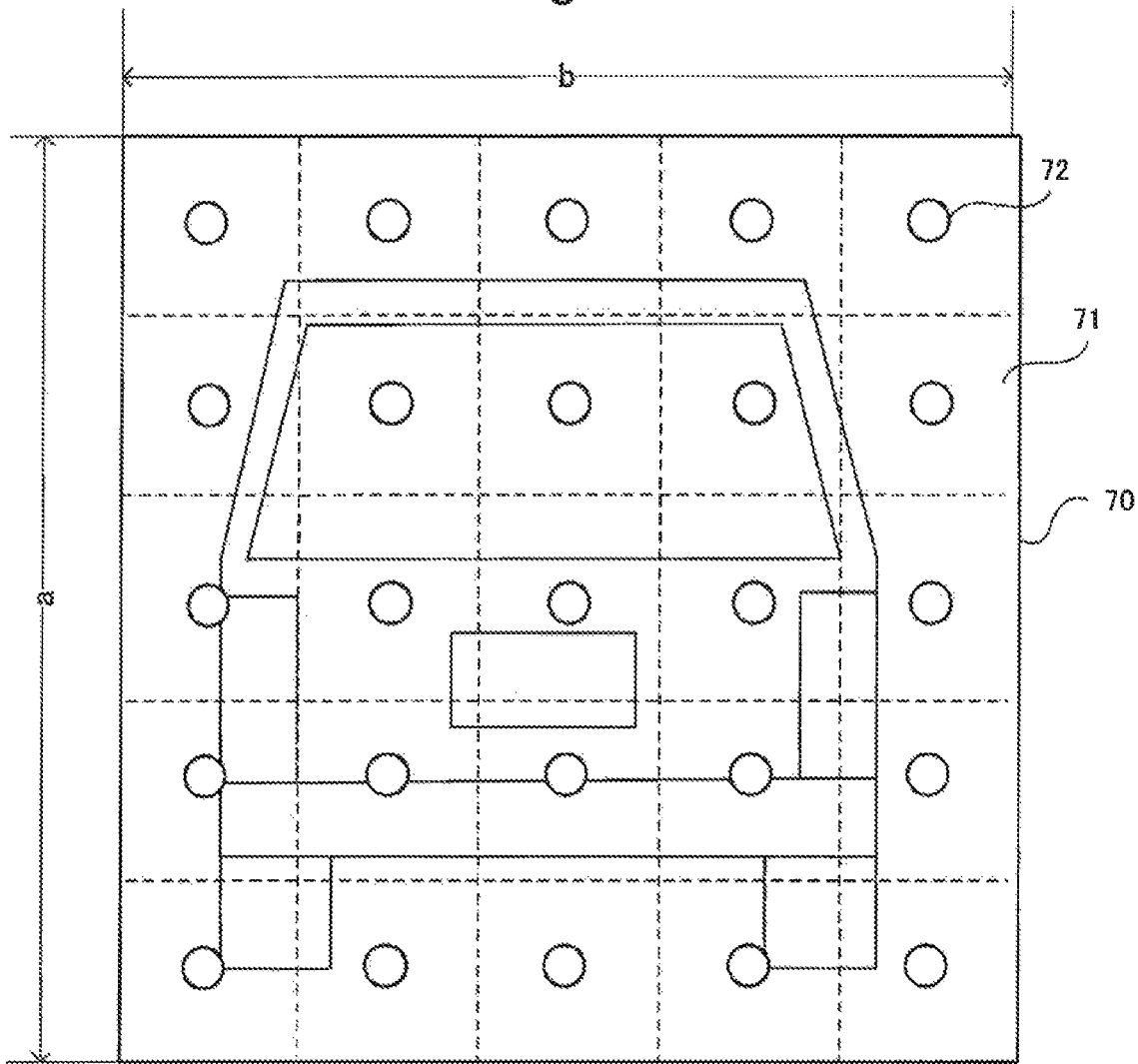
FIG. 5 is a diagram for explaining a step B1 illustrated in FIG. 4.
Figure 6:
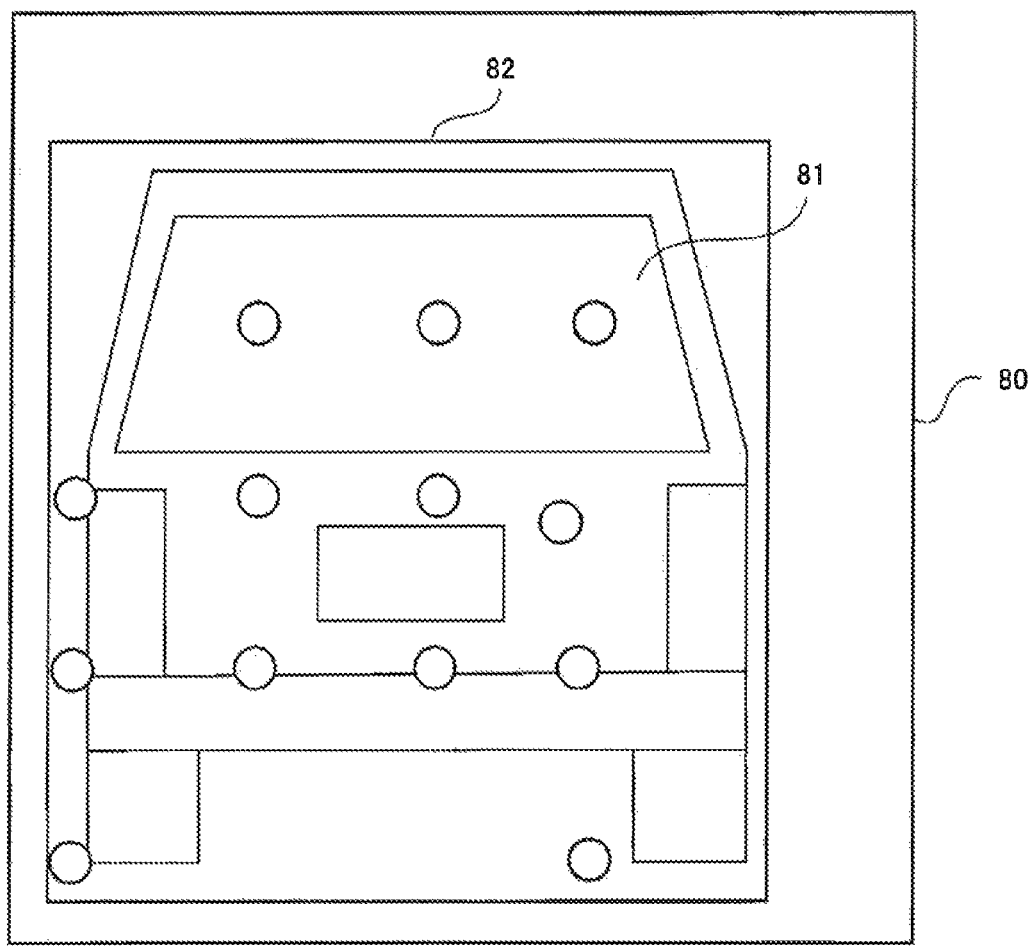
FIG. 6 is a diagram for explaining steps B2 and B3 illustrated in FIG. 4.
Figure 8A:
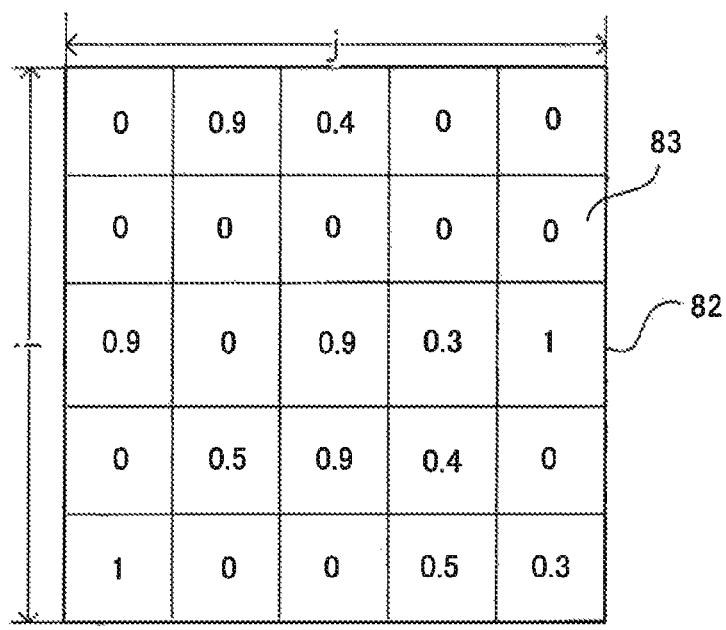
FIG. 8A is a diagram showing a result of a step B5 or B6, in steps from B5 to B8 shown in FIG. 4.
Figure 8B:
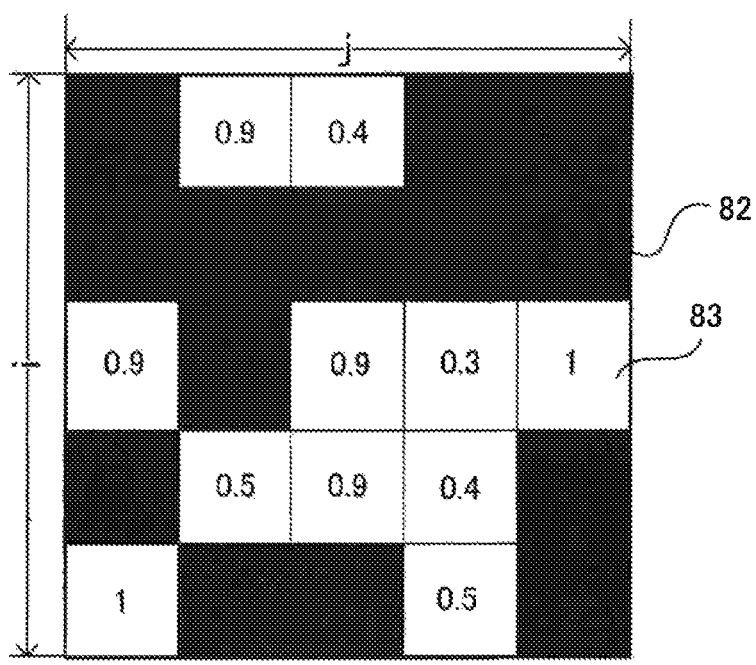
FIG. 8B is a diagram showing a result of a step B7, in steps from B5 to B8 shown in FIG. 4.
Figure 8C:
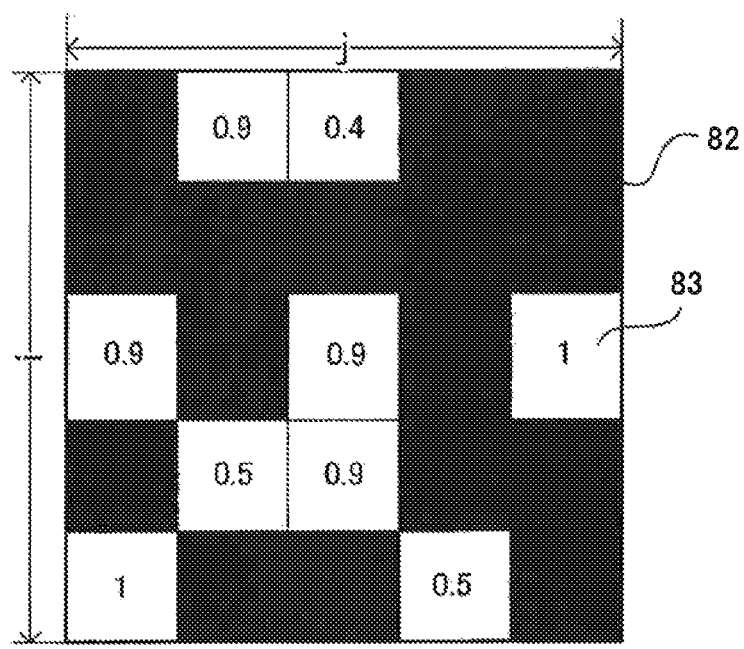
FIG. 8C is a diagram showing a result of a step B8, in steps from B5 to B8 shown in FIG. 4.

Hereinafter, the processing of tracking (step A4) and the processing of generating or updating a mask (step A5), which are illustrated in FIG. 3, are described more specifically using FIGS. 4 to 8. FIG. 4 is a flow chart specifically showing the processing of tracking and the processing of generating or updating a mask, which are illustrated in FIG. 3. FIG. 5 is a diagram for explaining a step B1 illustrated in FIG. 4. FIG. 6 is a diagram for explaining steps B2 and B3 illustrated in FIG. 4. FIG. 7 is a diagram for explaining a step B4 illustrated in FIG. 4. FIG. 8 is a diagram for explaining steps B5 to B8 illustrated in FIG. 4. FIG. 8A illustrates a result of the step B5 or B6, FIG. 8B illustrates a result of the step B7, and FIG. 8C illustrates a result of the step B8.

As shown in FIG. 4, first, the target tracking unit 50 acquires a target area identified in the previous frame in the step A4, and extracts feature points from the acquired target area (step B1).

Specifically, as shown in FIG. 5, the target tracking unit 50 divides the target area 70 of the previous frame into meshes (e.g. a×b meshes), thereby generating subregions 71. Then, the target tracking unit 50 extracts centers of the subregions 71 as feature points 72. When a mask has already been generated, the target tracking unit 50 superposes the mask on the target area 70 of the previous frame, and extracts feature points 72 excluding feature points of subregions overlapped by the mask. The target tracking unit 50 may extract feature points on the basis of variation of pixels in the target area, or the like, without regard to the subregions 71.

Next, in image data of a current frame, the target tracking unit 50 identifies feature points corresponding to the feature points extracted from the last frame (step B2). Specifically, as shown in FIG. 6, the target tracking unit 50 extracts, from image data 80 of the current frame, feature points corresponding to the feature points 72 illustrated in FIG. 5, as corresponding points 81.

Next, the target tracking unit 50 identifies a target area 82 in the current frame by determining a position and a size of the target area 82 in the current frame on the basis of a distribution of the corresponding points (step B3). That causes the target to be tracked. Specifically, as shown in FIG. 6, the mask generation unit 20 sets a rectangle enclosing regions in which the corresponding points 81 are distributed, and identifies the rectangle as the target area 82 in the current frame. The steps B1 to B3 described above correspond to the step A4 illustrated in FIG. 3.

Next, the mask generation unit 20 calculates a moving direction of each of the corresponding points, and determines a most frequent moving direction (step B4). Specifically, as shown in FIG. 7, the mask generation unit 20 compares positions of the feature points 72 of the previous frame with positions of the corresponding points 81, thereby identifying directions of changes in the positions, and determines the identified directions as moving directions of the corresponding points.

Next, the mask generation unit 20 determines whether the number of corresponding points in the most frequent moving direction is equal to or less than half of the total number (step B5). When the result of determining in the step B5 indicates that the number of corresponding points in the most frequent moving direction is not equal to or less than half of the total number, the mask generation unit 20 determines the most frequent moving direction to be a dominant direction, and divides the target area 82 into meshes (e.g. i×j meshes), and thereby generates subregions 83. Then, the mask generation unit 20 counts individually in the subregions 83 the numbers of corresponding points the moving directions of which correspond to the dominant direction, and normalizes the counted numbers (step B6). A result thereof is as shown in FIG. 8A.

Meanwhile, when the result of determining in the step B5 indicates that the number of corresponding points in the most frequent moving direction is equal to or less than half of the total number, the mask generation unit 20 counts individually in the subregions 83 the numbers of corresponding points, and normalizes the counted numbers (step B7). A result thereof is shown in FIG. 8A.

Next, after executing the step B5 or B6, the mask generation unit 20 determines a subregion 83 in which a normalized number is 0.0 to be a target of shielding, as shown in FIG. 8B (step B8). A subregion in which a normalized value is 0.0 is either a subregion including no feature point the moving direction of which corresponds to the dominant direction or a subregion including no corresponding point.

Next, the mask generation unit 20 further determines a subregion that continues for a set time period in a state in which the normalized number thereof is equal to or smaller than a threshold value to be a target of shielding, as shown in FIG. 8C (step B9). Specifically, in an example of FIG. 8C, the threshold value is set to be 0.4. The normalized values in subregions of (i,j)=(3,4) and (4,4) continue for a set number of frames in a state in which the normalized values thereof are equal to or smaller than 0.4, and thus those subregions are determined to be targets of shielding. In contrast, in a subregion of (i,j)=(1,3), though a normalized number is 0.4, a state in which the normalized number is equal to or smaller than the threshold value does not continue for a set time period, and thus the subregion is not determined to be a target of shielding.

Next, the mask generation unit 20 determines whether the number of subregions that is not shielded is equal to or larger than a certain value (step B10). The result of determination in the step B10 indicates that the number of subregions that is not shielded is equal to or larger than the certain value, the mask generation unit 20 generates a mask which shields a region outside the target area 82 and the subregions that are determined to be targets of shielding (step B11). In the subsequent steps A6 and A8, the mask generated in the step B11 is superposed on the template generated or updated in the step A3.

In contrast, when the result of determination in the step B10 is that the number of subregions that are not shielded is not equal to or larger than the certain value, the mask generation unit 20 ends the step A5 without generating a mask. In that case, the template generated or updated in the step A3 is used in the step A6 without change.

Effect of Example Embodiment

As described above, executing steps A1 to A9 and steps B1 to B11 causes a mask to be generated or updated on the basis of temporal variation of feature points of a target of detection and tracking. A shape of the template is optimized using a mask when updated. As a result, the present example embodiment enables prevention of mistracking and at the same time improvement in ability of coping with target deformation. As described with regard to the steps B1 to B9, tracking a target and generation of a mask are performed successively, and therefore increase caused by generation of a mask in load of processing is suppressed.

Program

A program of the present example embodiment may be a program causing a computer to execute steps A1 to A9 illustrated in FIG. 3 and steps B1 to B11 illustrated in FIG. 4. The program which is installed in a computer and execute is capable of achieving the image detection device 100 and the image detection method of the present example embodiment. In that case, a Central Processing Unit (CPU) of the computer functions as the template generation unit 10, the mask generation unit 20, the detection unit 30, the data acquisition unit 40, the target tracking unit 50 and the image selection unit 60, and performs the processing thereof.

A program of the present example embodiment may be executed on a computer system including a plurality of computers. In that case, for example, each of the plurality of computers may function as any of the template generation unit 10, the mask generation unit 20, the detection unit 30, the data acquisition unit 40, the target tracking unit 50 and the image selection unit 60.

Figure 9:
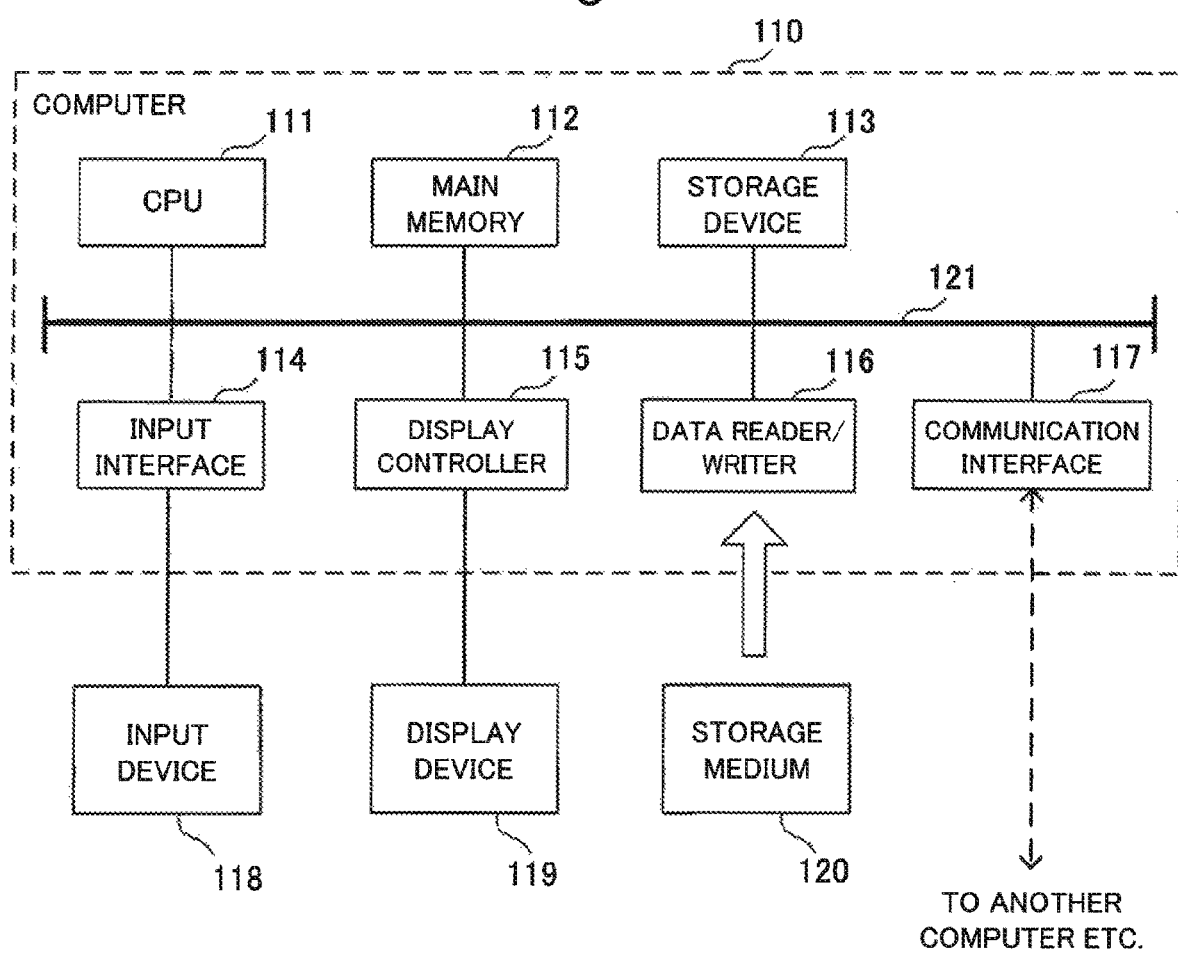
FIG. 9 is a block diagram showing an example of a computer for achieving the image detection device of the example embodiment of the present invention.

Hereinafter, a computer which achieves the image detection device 100 by executing a program of the present example embodiment is described using FIG. 9. FIG. 9 is a block diagram showing an example of a computer achieving the image detection device 100 of the present example embodiment.

As shown in FIG. 9, the computer 110 includes a CPU 111, a main memory 112, a storage device 113, an input interface 114, a display controller 115, a data reader/writer 116 and a communication interface 117. These components are connected with each other via a bus 121 in a manner that data communication can be performed.

The CPU 111 performs various operations by loading into the main memory 112 a program (i.e. cord) of the present example embodiment stored in the storage device 113, and by executing the loaded program in a predetermined order. The main memory 112 is typically a volatile storage device such as a Dynamic Random Access Memory (DRAM). A program of the present example embodiment is provided in a state in which it is stored in a computer readable storage medium 120. A program of the present example embodiment may be distributed on the Internet connected via the communication interface 117.

Specific examples of the storage device 113 may be a hard disk drive and a semiconductor storage device such as a flash memory. The input interface 114 relays data transmission between the CPU 111 and an input device 118 such as a keyboard or a mouse. The display controller 115 is connected with a display device 119 and controls display on the display device 119.

The data reader/writer 116 relays data transmission between the CPU 111 and the storage medium 120, and executes reading a program from the storage medium 120 and writing a processing result by the computer 110 into the storage medium 120. The communication interface 117 relays data transmission between the CPU 111 and another computer.

Specific examples of the storage medium 120 may be a general-purpose semiconductor storage device such as a Compact Flash (CF) (registered trademark) and a Secure Digital (SD), a magnetic storage medium such as a flexible disk, and an optical storage medium such as a CD-ROM (Compact Disk Read Only Memory).

The image detection device 100 of the present example embodiment can also be achieved by using hardware corresponding to the units, instead of a computer in which a program installed. Part of the image detection device 100 may be achieved by a program, and the remaining part may be achieved by hardware.

Part or the whole of the above-described example embodiment can be described as, but is not limited to, the following Supplementary Notes.

Supplementary Note 1

An image detection device including:
template generation means for generating a template for detecting a target;
mask generation means for generating a mask partly shielding the template based on temporal variation of feature points extracted from an area including the target in an input image; and
detection means for detecting the target from the image by using the template partly shielded by the mask.

Supplementary Note 2

The image detection device according to Supplementary Note 1, wherein
the mask generation means identifies moving directions of feature points as the temporal variation, and generates the mask based on the identified moving directions.

Supplementary Note 3

The image detection device according to Supplementary Note 2, wherein
the mask generation means identifies a dominant direction in the identified moving directions of the feature points, and generates the mask by shielding a region including a feature point whose moving direction is different from the dominant direction.

Supplementary Note 4

The image detection device according to Supplementary Note 3, wherein
the mask generation means generates the mask by further shielding a region including none of the feature points.

Supplementary Note 5

The image detection device according to Supplementary Note 3 or 4, wherein
the mask generation means shields a region including a feature point whose moving direction is different from the dominant direction when the region continues for a set time period in a state in which a number or a proportion of feature points whose moving directions are the dominant direction is equal to or smaller than a threshold.

Supplementary Note 6

The image detection device according to any one of Supplementary Notes 1 to 5, further including:
target tracking means for tracking the target by using, in the feature points extracted from the area including the target in the image, a feature point other than a feature point extracted from a region overlapping the mask; and
image selection means for calculating a similarity to the template, for each of images of the area from which the feature point used for tracking the target by the target tracking means are extracted and of the detected target, and selecting either of the images based on the calculated similarity, wherein
the template generation means updates the template by using the selected image.

Supplementary Note 7

An image detection method including:
generating a template for detecting a target;
generating a mask partly shielding the template based on temporal variation of feature points extracted from an area including the target in an input image; and detecting the target from the image using the template partly shielded by the mask.

Supplementary Note 8

The image detection method according to Supplementary Note 7, the method including identifying moving directions of the feature points as the temporal variation, and generating the mask based on the identified moving directions.

Supplementary Note 9

The image detection method according to Supplementary Note 8, the method including identifying a dominant direction in the identified moving directions of the feature points, and generating the mask by shielding a region including a feature point whose moving direction is different from the dominant direction.

Supplementary Note 10

The image detection method according to Supplementary Note 9, the method including generating the mask by further shielding a region including none of the feature points.

Supplementary Note 11

The image detection method according to Supplementary Note 9 or 10, the method including shielding a region including a feature point whose moving direction is different from the dominant direction when the region continues for a set time period in a state in which a number or a proportion of feature points whose moving directions are the dominant direction is equal to or smaller than a threshold.

Supplementary Note 12

The image detection method according to any one of Supplementary Notes 7 to 11, the method including:

tracking the target by using, in the feature points extracted from the area including the target in the image, a feature point other than a feature point extracted from a region overlapping the mask;

calculating a similarity to the template, for each of images of the area from which the feature point used for tracking the target are extracted and of the detected target, and selecting either of the images based on the calculated similarity; and updating the template by using the selected image.

Supplementary Note 13

A storage medium storing a program causing a computer to execute:

a template generation process of generating a template for detecting a target;

a mask generation process of generating a mask partly shielding the template based on temporal variation of feature points extracted from an area including the target in an input image; and a detection process of detecting the target from the image by using the template partly shielded by the mask.

Supplementary Note 14

The storage medium according to Supplementary Note 13, wherein the mask generation process identifies moving directions of the feature points as the temporal variation, and generates the mask based on the identified moving directions.

Supplementary Note 15

The storage medium according to Supplementary Note 14, wherein the mask generation process identifies a dominant direction in the identified moving directions of the feature points, and generates the mask by shielding a region including a feature point whose moving direction is different from the dominant direction.

Supplementary Note 16

The storage medium according to Supplementary Note 15, wherein the mask generation process generates the mask by further shielding a region including none of the feature points.

Supplementary Note 17

The storage medium according to Supplementary Note 15 or 16, wherein the mask generation process shields a region including a feature point whose moving direction is different from the dominant direction when the region continues for a set time period in a state in which a number or a proportion of feature points whose moving directions are the dominant direction is equal to or smaller than a threshold.

Supplementary Note 18

The storage medium according to any one of Supplementary Notes 13 to 17, the program causing the computer to further execute:

a target tracking process of tracking the target by using, in the feature points extracted from the area including the target in the image, a feature point other than a feature point extracted from a region overlapping the mask; and an image selection process of calculating similarity to the template, for each of images of the area from which the feature point used for tracking the target by the target tracking process are extracted and of the detected target, and selecting either of the images based on the calculated similarity, wherein the template generation process updates the template by using the selected image.

As described above, the present invention is capable of improving ability of coping with deformation of a target by performing optimization of a shape of a template using a dynamic mask in a case of detecting a target in an image. Even when a target is temporarily shielded, the present invention is capable of suppressing influence thereof. The present invention is useful particularly for a surveillance system, a digital camera, a camera installed in a mobile body, and the like.

REFERENCE SIGNS LIST

10 Template generation unit
20 Mask generation unit
30 Detection unit
40 Data acquisition unit
50 Target tracking unit
60 Image selection unit 70 Target area in last frame
71 Subregion
72 Feature point
80 Image data for current frame
81 Corresponding point
82 Target area in current frame
83 Subregion
100 Image detection device
110 Computer
111 CPU
112 Main memory
113 Storage device
114 Input interface
115 Display controller
116 Data reader/writer
117 Communication interface
118 Input device
119 Display device
120 Recording medium
121 Bus

The invention claimed is:

1. An image detection device comprising:
at least one memory that stores a set of instructions; and
at least one processor configured to execute the set of instructions to:
generate a template for detecting a target;
divide an area in an input image into subregions, the area including the target;
extract centers of the subregions as feature points;
generate a mask partly shielding the template based on temporal variation of the feature points;
detect the target from the image by using the template partly shielded by the mask;
determine, when updating the mask, whether a count of the subregions not to be shielded is equal to or larger than a predetermined value;
generate the mask when the count of the subregions not to be shielded by the mask is equal to or larger than the predetermined value; and
cause the mask to shield the template, and
the at least one processor is configured not to generate the mask when the count of the subregions to be shielded by the mask is larger than the predetermined value.

2. The image detection device according to claim 1, wherein
the at least one processor is further configured to:
identify, in a second image, second feature points corresponding to the feature points; and
identify, as the area including the target, a rectangle enclosing regions in which the second feature points are distributed.

3. The image detection device according to claim 1, wherein
the at least one processor is further configured to:
calculate moving directions to second feature points in a second image from the respective feature points, the second feature points corresponding to the respective feature points;
determine a most frequent moving direction among the moving directions;
determine whether occurring number of the most frequent moving direction is equal to or larger than a half of a total number of the moving directions;
count the second feature points moving in the most frequent direction in each of the subregions when the occurring number is not equal to or larger than the total number;
count the second feature points in each of the subregions when the occurring number is equal to or larger than the total number; and
generate the mask based on a counted number of the second feature points in each of the subregions.

4. An image detection method comprising:
generating a template for detecting a target;
dividing an area in an input image into subregions, the area including the target;
extracting centers of the subregions as feature points;
generating a mask partly shielding the template based on temporal variation of the feature points;
detecting the target from the image by using the template partly shielded by the mask;
determining, when updating the mask, whether a count of the subregions not to be shielded is equal to or larger than a predetermined value;
generating the mask when the count of the subregions not to be shielded by the mask is equal to or larger than the predetermined value;
causing the mask to shield the template, and
generating no mask when the count of the subregions to be shielded by the mask is larger than the predetermined value.

5. The image detection method according to claim 4, further comprising:
identifying, in a second image, second feature points corresponding to the feature points; and
identifying, as the area including the target, a rectangle enclosing regions in which the second feature points are distributed.

6. The image detection method according to claim 4, further comprising:
identifying, in a second image, second feature points corresponding to the feature points; and
identifying, as the area including the target, a rectangle enclosing regions in which the second feature points are distributed.

7. A non-transitory computer readable storage medium storing a program causing a computer to execute:
template generation processing of generating a template for detecting a target;
tracking processing of dividing an area in an input image into subregions, the area including the target;
extraction processing of extracting centers of the subregions as feature points;
mask generation processing of generating a mask partly shielding the template based on temporal variation of the feature points; and
detection processing of detecting the target from the image by using the template partly shielded by the mask,
wherein the mask generation processing includes:
processing of determining, when updating the mask, whether a count of the subregions not to be shielded is equal to or larger than a predetermined value;
processing of generating the mask when the count of the subregions not to be shielded by the mask is equal to or larger than the predetermined value; and
processing of causing the mask to shield the template, and
wherein the mask generation processing does not generate the mask when the count of the subregions to the shielded by the mask is larger that the predetermined value.

8. The storage medium according to claim 7, wherein the tracking processing includes:

processing of identifying, in a second image, second feature points corresponding to the feature points; and processing of identifying, as the area including the target, a rectangle enclosing regions in which the second feature points are distributed.

9. The storage medium according to claim 7, wherein the mask generation processing includes:

processing of calculating moving directions to second feature points in a second image from the respective feature points, the second feature points corresponding to the respective feature points;

processing of determining a most frequent moving direction among the moving directions;

processing of determining whether occurring number of the most frequent moving direction is equal to or larger than a half of the total number of the moving directions;

processing of counting the second feature points moving in the most frequent direction in each of the subregions when the occurring number is not equal to or larger than the total number;

processing of counting the second feature points in each of the subregions when the occurring number is equal to or larger than the total number; and processing of generating the mask based on a counted number of the second feature points in each of the subregions.

\* \* \* \* \*